United States Patent
Henning

(10) Patent No.: US 7,798,940 B2
(45) Date of Patent: Sep. 21, 2010

(54) METHOD FOR DETERMINING THE FILLING PRESSURE FOR A CLUTCH

(75) Inventor: Manfred Henning, Meerbusch (DE)

(73) Assignee: Getrag Ford Tranmissions GmbH, Cologne (DE)

( * ) Notice: Subject to any disclaimer, the term of this patent is extended or adjusted under 35 U.S.C. 154(b) by 462 days.

(21) Appl. No.: 11/861,269

(22) Filed: Sep. 25, 2007

(65) Prior Publication Data

US 2008/0076631 A1  Mar. 27, 2008

(30) Foreign Application Priority Data

Sep. 25, 2006  (DE) .................. 10 2006 045 573

(51) Int. Cl.
  *B60W 10/04*  (2006.01)
  *B60W 10/18*  (2006.01)
  *G06F 7/00*  (2006.01)
  *G06F 17/00*  (2006.01)
(52) U.S. Cl. ................. 477/174; 477/180; 701/67
(58) Field of Classification Search ............... 477/174, 477/180; 701/67, 68
See application file for complete search history.

(56) References Cited

U.S. PATENT DOCUMENTS

| 5,737,979 A | 4/1998 | McKenzie et al. | |
| 7,393,305 B2 * | 7/2008 | Yamada et al. | 477/110 |
| 7,563,196 B2 * | 7/2009 | Yamada et al. | 477/110 |
| 2006/0148614 A1 | 7/2006 | Takagi et al. | |
| 2009/0127061 A1 * | 5/2009 | Krauss et al. | 192/85 R |
| 2009/0209383 A1 * | 8/2009 | Olson et al. | 475/120 |

FOREIGN PATENT DOCUMENTS

| DE | 10137581 | | 1/2003 |
| DE | 10227361 | | 1/2004 |
| DE | 10361288 | | 7/2005 |
| EP | 0742389 | | 11/1996 |
| JP | 2002250432 | A * | 9/2002 |

OTHER PUBLICATIONS

European Search Report and Written Opinion issued by the European Patent Office in the parallel EP 1903240 (07116871.0).

* cited by examiner

*Primary Examiner*—Tisha D Lewis
(74) *Attorney, Agent, or Firm*—Schlee IP International, P.C.; Alexander R. Schlee

(57) ABSTRACT

Method for determining the filling pressure for a clutch that comprises clutch linings, a clutch release spring, and a hydraulic pressure system for closing the clutch against the force of the clutch release spring. By several method steps iteratively a set-filling-pressure is determined that allows an optimum pressure to bring the clutch linings quickly into an abutting position at an engagement point, but avoiding such high pressure that would press the clutch linings against each other in a manner that would cause the clutch to transmit torque.

19 Claims, 4 Drawing Sheets

METHOD FOR DETERMINING THE FILLING PRESSURE FOR A CLUTCH

This application claims the priority of the German patent application DE 102006045573.8, filed on Sep. 25, 2006.

BACKGROUND OF THE INVENTION

The invention relates to a method for determining the filling pressure for a clutch that comprises clutch linings, a clutch release spring, and a hydraulic pressure system for closing the clutch against the force of the clutch release spring, wherein at an engagement point of the clutch the clutch linings abut against each other and any further increase in pressure in the pressure system immediately creates the capacity of the clutch in transmitting a torque.

Usually, the pressure system comprises of a clutch cylinder and a clutch piston that are rigidly connected with an input side or an output side of the clutch and rotate with this clutch. At an engagement point of the clutch the force from the clutch piston to the clutch linings and the force from the clutch release spring equalize each other so that the clutch linings are in abutment, but without being subjected to any force pressing the clutch linings against each other.

In motor vehicle design it becomes more and more common to use clutches in the dual clutch transmissions that are automatically controlled by a control apparatus. In that kind of control, specific knowledge of the engagement point is crucial for the quality of operating the clutch.

For reaching from an entirely disengaged or open clutch this engagement point, the clutch cylinder has to be filled with hydraulic fluid. For effecting this filling process the filling pressure can be set to a high value. By a high filling pressure a high volume flow can be set in that pressure system so that the clutch cylinder is filled quickly and the engagement point, starting from the open clutch, can be reached in a short period of time. However, this results in the risk that the high filling pressure when filling the clutch cylinder causing the clutch piston to exert a force on the clutch linings is higher than the counterforce exerted by the clutch release spring, resulting in that the clutch linings are not only in abutment, but are actually pressed against each other, causing the clutch to have the capacity to transmit torque, which is not desired at this point in time. For control of a clutch that is for instance used in a motor vehicle, this is detrimental to the driving comfort.

If in contrast a comparatively low filling pressure is set, filling the clutch cylinder and therefore reaching the engagement point would cost too much time, likewise resulting in a detrimental effect on the gear shifting comfort.

SUMMARY OF THE INVENTION

It is one object of the invention to create a method for determining the filling pressure for the clutch allowing closing and opening the clutch quickly up to the engagement point but avoiding establishment of any substantial torque transmitting capacity in the clutch before it is desired to create this capacity.

According to a first aspect of the invention in a first method step A the pressure system is subjected to a set-filling-pressure $p_{BSet}$ at an estimated value or a resulting value from a prior determination and subsequently this pressure is verified. During the subjection of the pressure system to the set-filling-pressure $p_{BSet}$ in a method step B an actual pressure $p_{Act}$ in the pressure system is determined. Subjecting the pressure system to the set-filling-pressure $p_{BSet}$ ends when the actual pressure $p_{Act}$ at a point in time $t_1$ has reached a threshold-turnoff-pressure $p_{Off}$ (step C). The point in time $t_1$ is not a fixed point in time, but depends on the development of the actual pressure $p_{Act}$ or the chosen level of the threshold-turnoff-pressure $p_{Off}$.

After the actual pressure $p_{Act}$ has reached the threshold-turnoff-pressure $p_{Off}$ the pressure system is now subjected to a set-abutting-pressure $p_{ASet}$. The set-abutting-pressure $p_{ASet}$ equals thereby the pressure in the pressure system just equalizing the force from the clutch release spring when the clutch linings are in abutment. Therefore, by means of the set-abutting-pressure $p_{ASet}$ the engagement point of the clutch can be set (compare step D). A determination of the characteristic K follows now in step E indicating whether after the point in time $t_1$ between a point in time $t_3$ and a point in time $t_4$ the actual pressure $p_{Act}$ is above or below the set-abutting-pressure $p_{ASet}$. The steps A-E are a cycle that, according to the invention, is performed several times wherein the set-filling-pressure $p_{BSet}$ is changed at every repetition by an increment p up to the moment when the termination criterion is fulfilled. Choosing the absolute value for the increment p for changing the set-filling-pressure $p_{BSet}$ (increase or decrease) is performed from cycle to cycle so that the set-filling-pressure $p_{BSet}$ approaches an "optimum" set-filling-pressure allowing the fast filling of the clutch cylinders without having the clutch exceeding the engagement point. When the termination criterion of the method is fulfilled, the set-filling-pressure $p_{BSet}$ of the last cycle is stored and can be used for controlling the operation of the clutch.

According to a preferred embodiment the characteristic K is the integral of the difference between the actual pressure $p_{Act}$ and the set-abutting-pressure $p_{ASet}$ between the points in time $t_3$ and $t_4$. Using an integral for the characteristic K has among other advantages the specific advantage that possible noise is substantially filtered out. Therefore, no single signal peaks decide about whether the set-filling-pressure is too high or too low. Accordingly, the characteristic K is calculated in accordance with the following equation:

$$K = \int_{t_3}^{t_4} (p_{Act} - p_{ASet}) \cdot dt$$

The set-filling-pressure $p_{BSet}$ can be increased for the next cycle by the increment p if the characteristic K is below zero. In this case, between the points in time $t_3$ and $t_4$ the average actual pressure $p_{Act}$ is lower than the set-abutting-pressure $p_{ASet}$. A reason for that is that the clutch linings are not yet in abutment and the clutch pistons have to be moved, resulting in a volume flow within the pressure system. As a result of such flow losses within the pressure system the actual pressure $p_{Act}$ is lower than the set-abutting-pressure $p_{ASet}$. The set-filling-pressure $p_{BSet}$ can be decreased for the next cycle by the increment p if the characteristic K is above zero. In this case the average actual pressure $p_{Act}$ between the points in time $t_3$ and $t_4$ is higher than the set-abutting-pressure $p_{ASet}$ of the apparatus, indicating that the chosen set-filling-pressure $p_{BSet}$ is too high.

According to a preferred embodiment the increment p is reduced at least between 2 subsequent cycles. The reduction can be made when the algebraic sign of the characteristic K changes between two cycles. The respective change in sign indicates that the chosen set-filling-pressure $p_{BSet}$ of one of the cycles was too high and in the other of the two cycles of the set-filling-pressure $p_{BSet}$ was too low or vice versa. Put in other words: The "optimum" set-filling-pressure $p_{BSet}$ lies between the set-filling-pressures of the two cycles. By means of reducing the increment p the range between the set-filling-pressures of the two cycles can be determined better and therefore it is possible to get closer to the "optimum" set-filling-pressure in a step-by-step manner.

One possible termination criterion can be when the increment p drops below a threshold where the deviation is negligible, represented by the threshold-neglect-pressure $p_{Neglect}$. Another or additional termination criterion can be that the absolute value of characteristic K drops below the threshold-neglect value $K_{Neglect}$. In the ideal case, the characteristic K is 0, which means that the filling process with the set-filling-pressure $p_{BSet}$ does neither require an additional filling that would otherwise be required when the linings of the clutch are not abutting against each other, nor does a decrease in pressure of the pressure system happen.

Preferably, the difference-pressure $p_{Diff}$ between the threshold-turnoff-pressure $p_{Off}$ and the set-filling-pressure $p_{BSet}$ is set to be between 300 and 700 mbar. Good results can be achieved when the threshold-turnoff-pressure $p_{Off}$ is about 500 mbar below the set-filling-pressure $p_{BSet}$. The difference-pressure $p_{Diff}$ can be kept constant during the process, so that determination of an optimum filling can be restricted to only one parameter, namely the set-filling-pressure $p_{BSet}$. In a characteristic table with the parameters rotational speed and/or temperature the difference-pressure $p_{Diff}$ can be determined for setting the set-filling-pressure $p_{BSet}$ from the characteristic table.

A starting value for the set-filling-pressure is about 400 to 1000 mbar above the set-abutting-pressure $p_{ASoll}$. This results in values of the threshold-turnoff-pressure $p_{Off}$ that are 500 mbar above the set-abutting-pressure $p_{ASet}$.

Subjecting the pressure system with the set-filling-pressure $p_{BSet}$ should preferably start from a pressure $p_0$ at which the clutch is safely disengaged, that means open. This means that the pressure $p_0$ should be lower than the set-abutting-pressure $p_{ASet}$. Increasing the pressure $p_0$ to the set-filling-pressure $p_{BSet}$ therefore takes place at a point in time $t_0$.

By means of the method according to the invention good results can be achieved when the time difference $t_{3,4}$ between the point in time $t_3$ and the point in time $t_4$ is about 30 ms. This time difference $t_{3,4}$ is sufficiently high for smoothing out signal peaks resulting from calculating of the integral between the points in time $t_3$ and $t_4$.

Between the abrupt reduction of the set-filling-pressure $p_{BSet}$ the set-abutting-pressure $p_{ASet}$ at the point in time $t_1$ can be useful to plan for a time span of 20 to 30 ms, allowing the pressure system to adjust itself after the abrupt change in the set pressure.

The pressure system can comprise an electrically controllable control valve generating the pressure in the pressure system. This control valve sets in relation to an electrical control current the hydraulic pressure in the pressure system. For enhancing the quality of the control the pressure system comprises a superseding pressure controller controlling the electric current for the control valve.

When subjecting the pressure system to a set-filling-pressure $p_{BSet}$ according to the method according to the invention, for the superseding pressure controller, preferably a controller with a PD-characteristic (proportional-differential-characteristic) is used. In a preferred embodiment, at the point in time $t_1$, i.e. at the point in time when the set-filling-pressure $p_{BSet}$ is reduced to the set-abutting-pressure $p_{ASet}$, the superseding pressure controller is turned off until the pressure system has reached its build-up state after a transient state. For example, the superseding pressure controller stays turned off until the electrical current actual value of the cascade control current controller of the control valve reaches its set value or drops below it or until the actual pressure $p_{Act}$ reaches the set-abutting-pressure $p_{ASet}$ or drops below it, depending on what event occurs first. At the point in time $t_2$ then the superseding pressure controller, i.e. cascade pressure controller, is turned on, then preferably a PID-characteristic (proportional-integral-differential-characteristic) is used as an operating mode of the controller.

DETAILED DESCRIPTION OF THE DRAWINGS

Figure 1:
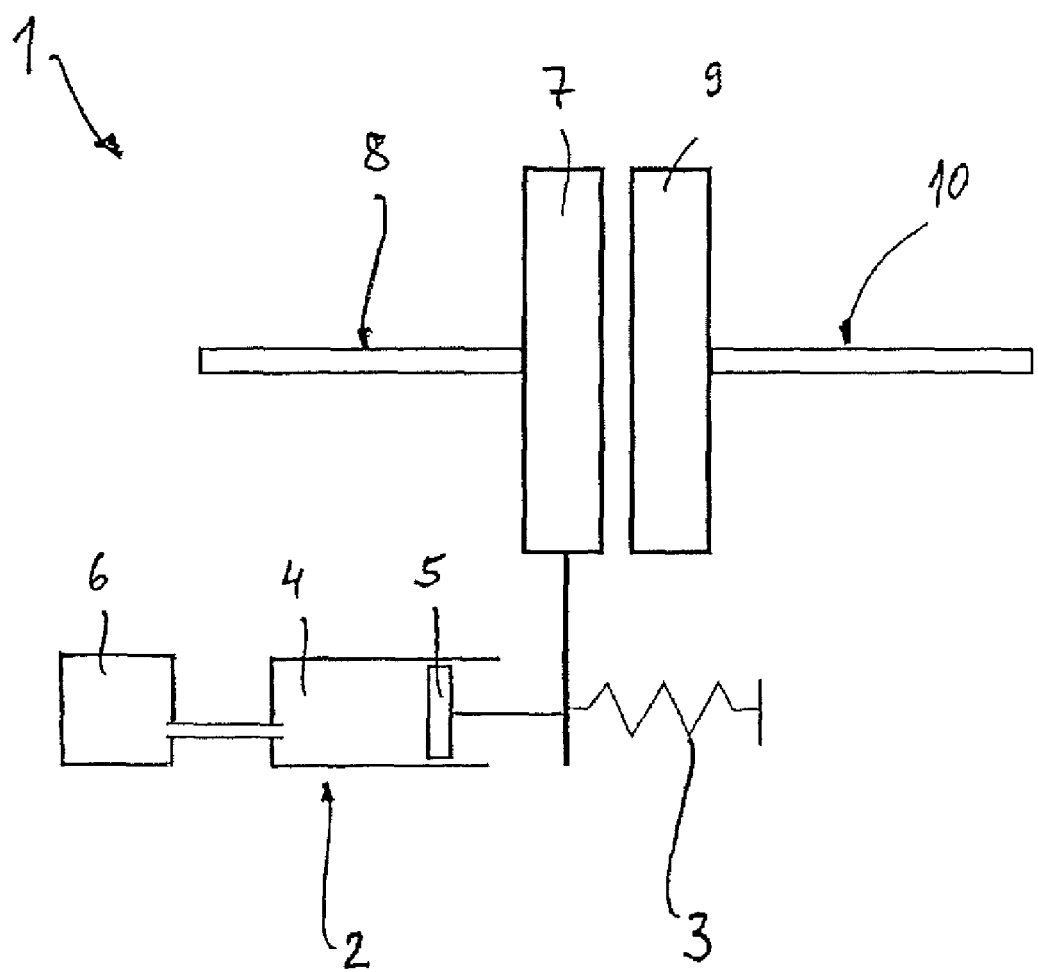
FIG. 1 shows a schematic view of a clutch with a hydraulic pressure system and a clutch release spring.

FIG. 1 shows a very schematic depiction of clutch 1, comprising a hydraulic pressure system 2 and a clutch release spring 3. The pressure system comprises one clutch cylinder 4 and one clutch piston 5. The pressure in the clutch cylinder 4 and at the clutch piston 5 can be controlled by means of control valve 6.

By means of the pressure system 2 the clutch lining 7 at the input side 8 of the clutch 1 can be pressed against the clutch lining 9 at the output side 10 of the clutch 1, wherein as a result of the frictional forces between the clutch linings 7, 9 the clutch 1 transmits a torque between the input side 8 and the output side 10. The clutch cylinder 4 and the clutch piston 5 are connected to the input side 8, so that these rotate together with the input side 8.

If the clutch piston 5 is not subjected to any hydraulic pressure, the clutch release spring 3 urges the clutch linings 7, 9 to separate, so that the clutch 1 is in its released position and no torque can be transmitted therethrough. In the clutch cylinder 4 only one specific pressure can be set causing the clutch linings 7, 9 to abut against each other, but wherein the abutting pressure between the clutch lining 7, 9 is zero or almost zero. In this case, the force on the clutch piston 5, as a result of being subjected to pressure in the clutch cylinder 4, equals the force generated by the compressed clutch release spring 3. Any further increase in the pressure within the clutch cylinder 4 would result in an immediate pressing of the clutch linings 7, 9 against each other, resulting in the transmittal of torque by means of the clutch. The pressure in the clutch cylinder 4 that causes such a specific force on the clutch piston 5 that equals the spring force of the compressed clutch release spring 3 when the clutch linings 7, 9 abut against each other is the same as the abutting pressure of the clutch (also called "stroke pressure") as a result of a set-abutting-pressure $p_{ASet}$ in the controlled pressure system 2.

When the clutch cylinder 5 is subjected to the set-abutting-pressure $p_{ASet}$, the clutch 1 is at its engagement point, at which no torque is transmitted through the clutch 1. For instance, the clutch 1 can be part of a dual clutch transmission with lubricated clutches, i.e. wet clutches, that is installed in a motor vehicle. For a short gear shift time the filling time of the clutch 1 and of other clutches of the dual clutch transmission should be kept short. Under filling time such a time has to be understood that is required to close the clutch from its released position to the engagement point.

Figure 2:
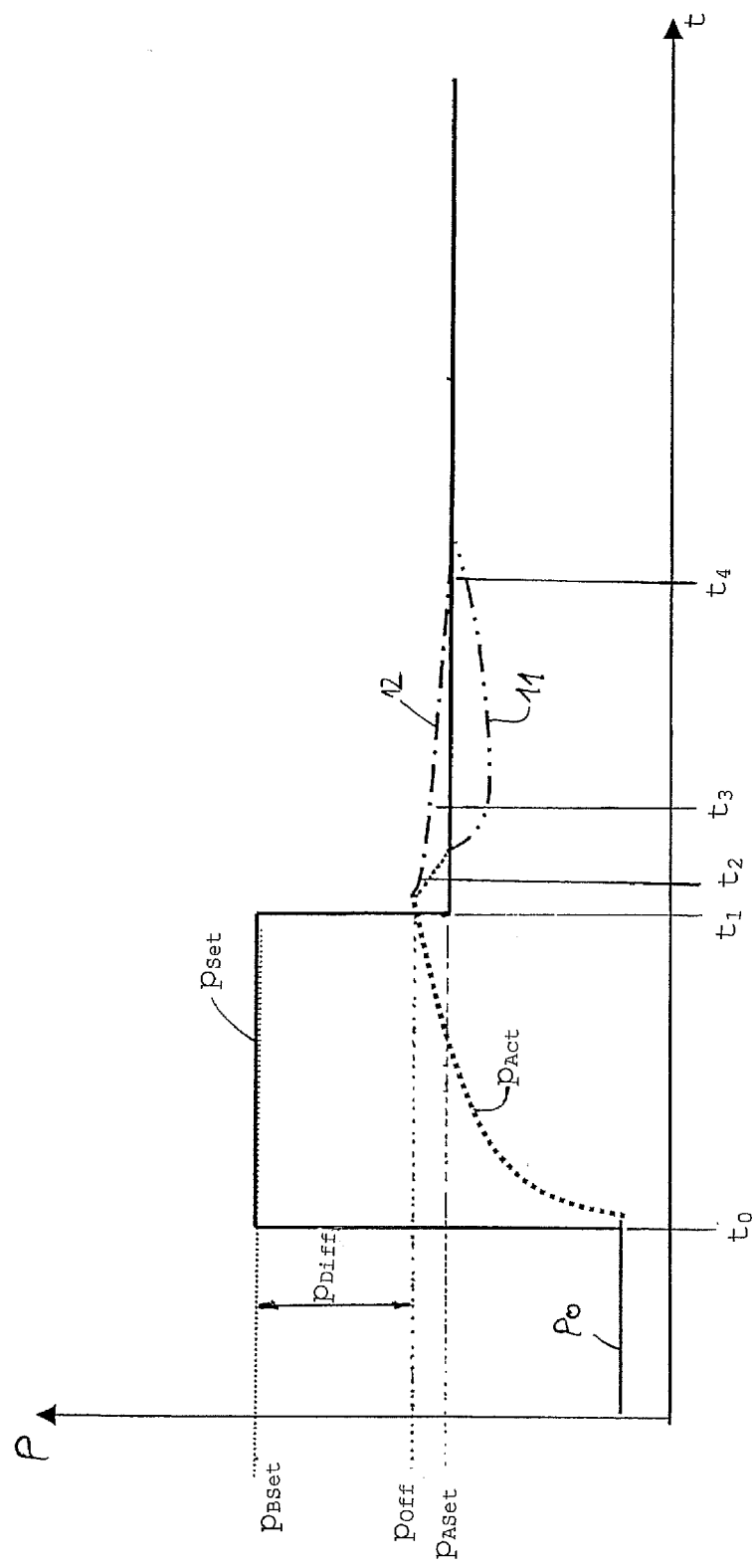
FIG. 2 shows various pressure graphs in the cycle according to one embodiment of the invention.

For determining the set-filling-pressure $p_{BSet}$ allowing a short filling time, according to the invention, the cycle is repeated several times, for which according to an embodiment shown in FIG. 2 a graph of the set pressure $p_{Set}$ (solid line) and possible graphs of the actual pressure $p_{Act}$ (dotted line or dot and dash line) are shown. During the cycle the pressure system is subjected to the shown set pressure $p_{Set}$. Due to the hydraulic characteristics of the pressure system and the entire clutch 1 and as a consequence of subjection to the set pressure the actual pressure $p_{Act}$ results that deviates more or less from the set pressure.

Initially, the pressure system is subjected to a pressure $p_0$ that is lower than the set-abutting-pressure $p_{ASet}$. This guarantees that the clutch 1 is released at the start of the cycle. At a time to the set pressure is increased to a set-filling-pressure $p_{BSet}$. If dealing with the first cycle running in the method according to the invention the set-filling-pressure $p_{BSet}$ has to be predetermined, that could for instance be 1.000 mbar above the known set-abutting-pressure $p_{ASet}$. Subjection of the pressure system 2 with the set-filling-pressure $p_{BSet}$ lasts until the measured actual pressure $p_{Act}$ reaches a threshold-turnoff-pressure $p_{Off}$. The threshold-turnoff-pressure $p_{Off}$ has to be predetermined as well and is preferably a function of the set-filling-pressure $p_{BSet}$. For example, the threshold-turnoff-pressure can be determined as comprising the constant difference pressure $p_{Diff}$, for example 500 mbar.

When the actual pressure $p_{Act}$ has reached the threshold-turnoff-pressure $p_{Off}$ (see point in time $t_1$), the set pressure $p_{set}$ is reduced to the set-abutting-pressure $p_{ASet}$. After just a few milliseconds at a point in time $t_2$ a PID-controller is turned on, that is superseded with the control valve 6 and adjusts for an enhanced control quality an electric control current for the control valve. After a certain transient period an integrator is started at a point in time $t_3$, determining the integral of the difference between the actual pressure $p_{Act}$ and the set-abutting-pressure $p_{ASet}$. The integral will then be calculated from a point in time $t_3$ up to a point time $t_4$.

If for example in the cycle the set-filling-pressure is chosen too low, the actual pressure $p_{Act}$ reaches the threshold-turnoff-pressure $p_{Off}$ before the clutch linings 7, 9 of the clutch 1 abut against each other. After reaching the threshold-turnoff-pressure $p_{Off}$ at then predetermined set-abutting-pressure $p_{ASet}$ an actual pressure $p_{Act}$ results in the pressure system 2 that is lower than the set-abutting-pressure $p_{ASet}$ (see reference sign 11). The reason for that is a volume flow in the pressure system and the flow losses resulting therefrom, that are necessary for moving the clutch piston 5 until the clutch linings 7, 9 abut against each other.

If the integral represents characteristic K as it has been defined in claim 2, a set-filling-pressure $p_{BSet}$ that is too low results in a characteristic K with a minus sign. For determining the optimum set-filling-pressure $p_{BSet}$ iteratively, the set-filling-pressure $p_{BSet}$ has to be increased by a particular increment p.

If in contrast the chosen set-filling-pressure $p_{BSet}$ is too high, the actual pressure $p_{Act}$ has to be controlled to decrease starting from the threshold-turnoff-pressure $p_{Off}$ to the set-abutting-pressure $p_{ASet}$. In this case, the filling process has resulted in that the clutch linings 7, 9 abut against each other and as a result of the actual pressure $p_{Act}$ that is higher than the set-abutting-pressure $p_{ASet}$ are pressed against each other. This has the consequence that the clutch 1 has been closed beyond its engagement point. A pressure graph for an actual pressure $p_{Act}$ that is too high is symbolized by the reference sign 12. As a result of controlling the pressure system the actual pressure $p_{Act}$ comes closer to the predetermined set-abutting-pressure $p_{ASet}$. The characteristic K or the integral of the difference between the actual pressure $p_{Act}$ and the set-abutting-pressure $p_{ASet}$ is thereby positive. This would have the consequence that at the next cycle the set-filling-pressure $p_{BSet}$ can be decreased by the increment p.

In running several times through the cycle shown in FIG. 2, each time with different set-filling-pressure $p_{BSet}$, and by determining the characteristic K that predetermines whether in the next cycle the set-filling-pressure $p_{BSet}$ is increased or decreased by an the increment p, the correct or optimum set-filling-pressure $p_{BSet}$ is determined in an iterative approximations procedure.

Figure 3:
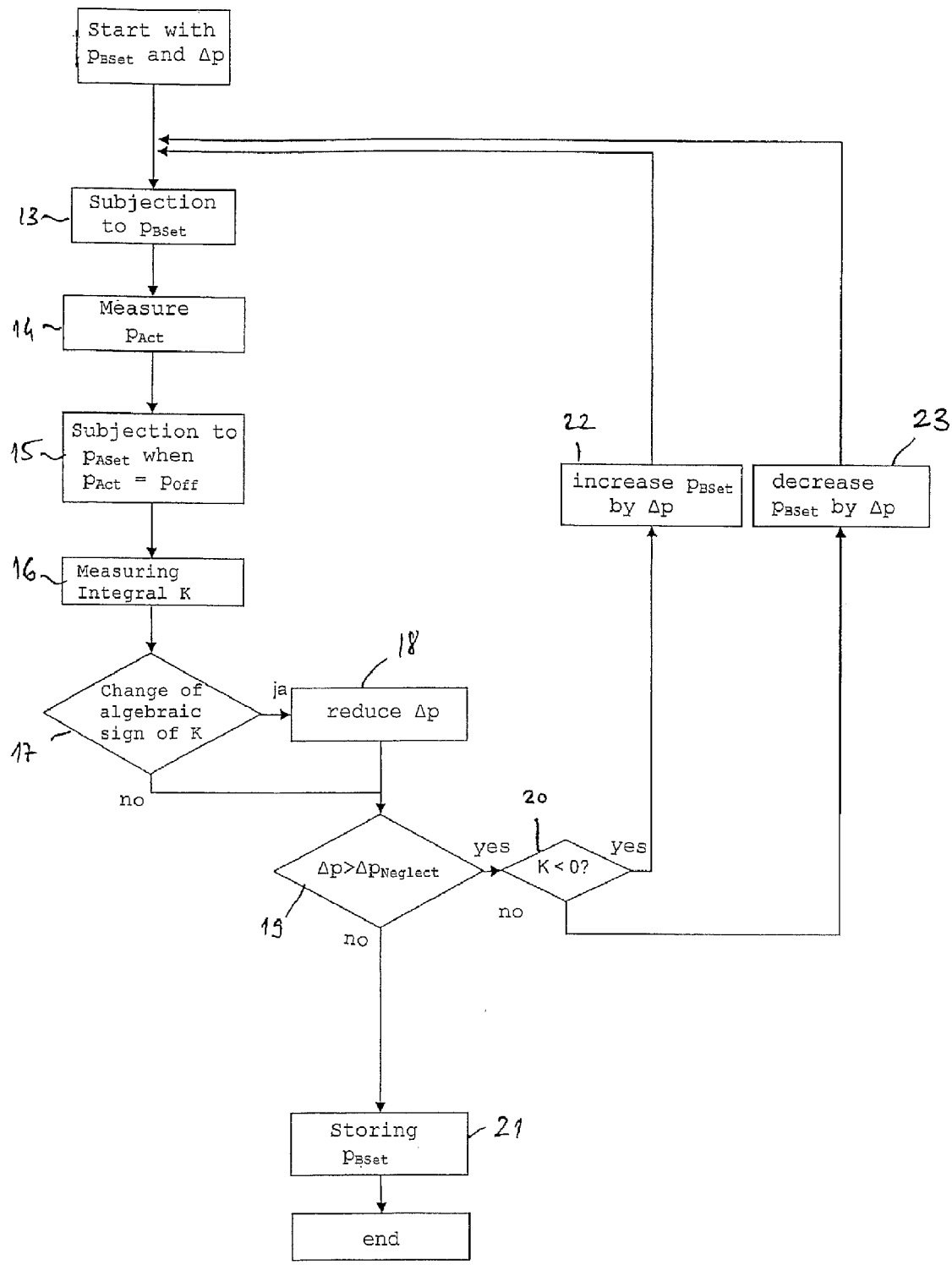
FIG. 3 shows a flow diagram of a preferred embodiment of the invention.

FIG. 3 shows a flow diagram of an embodiment of the invention. The reference signs 13, 14, 15, 16 denote processes or method steps as these have already been described in connection with the cycle shown in FIG. 2. After or during the subjection with the set-filling-pressure $p_{BSet}$ (process 13) the actual pressure $p_{Act}$ is measured in the pressure system 2 (process 14). The pressure system 2 is subjected to the set-abutting-pressure $p_{ASet}$ when the actual pressure $p_{Act}$ has reached the threshold-turnoff-pressure $p_{Off}$ (process 15). After a certain time delay the integral according to the equation in claim 2 is calculated for the characteristic K (process 16).

At the branching point 17 it is determined whether the algebraic sign of the characteristic K has changed in comparison with the previous cycle. If that is the case, in processes 18 the increment p is reduced by which the set-filling-pressure $p_{BSet}$ is changed from cycle to cycle. After the process 18 the branching points 19, 20 follow. At the branching point 20 it is determined whether the increment p is higher than the threshold-neglect-pressure $p_{Neglect}$. If that is not the case (i.e. p is lower than or equal to $p_{Neglect}$) the process is terminated and the set-filling-pressure $p_{BSet}$ of the last cycle is stored as the "correct" set-filling-pressure (process 21). If in contrast the increment p is higher than the threshold-neglect-pressure $p_{Neglect}$ the branching point 20 follows determining whether the characteristic K is lower than zero. If that is the case, the set-filling-pressure $p_{BSet}$ is increased for the next cycle by the increment p and the cycle with the processes 13 to 16 is repeated. If, however, the characteristic K is higher than zero, the set-filling-pressure $p_{BSet}$ is increased for the next cycle by the increment p (see processes 22, 23).

Figure 4:
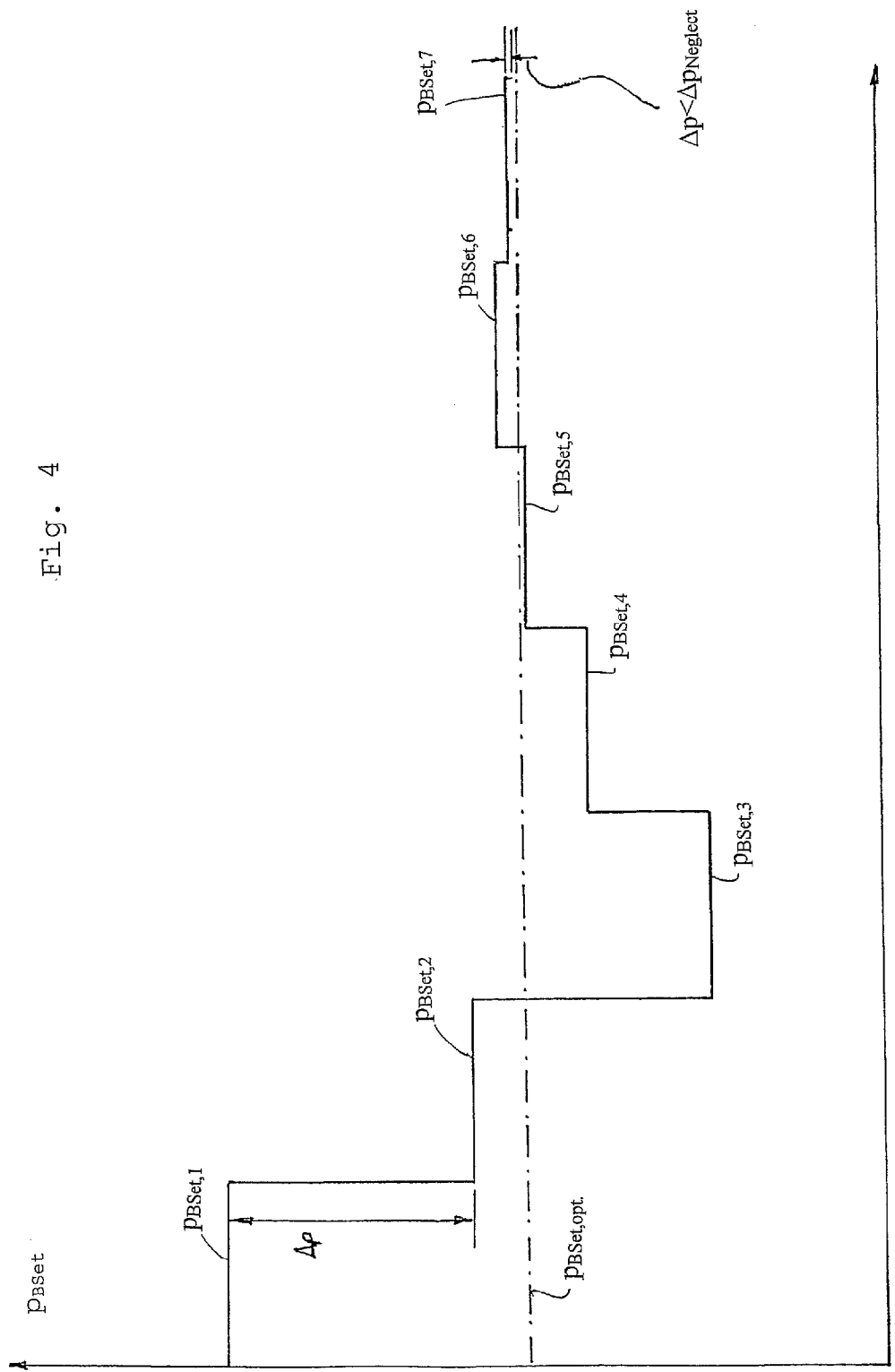
FIG. 4 shows one example of the graph for the filling-set-pressures for several cycles.

FIG. 4 shows the sequence of several set-filling-pressure-$sp_{BSet,i}$ of several sequential cycles. In the first cycle, the pressure system is subjected to the first set-filling-pressure $p_{BSet,1}$. This first set-filling-pressure $p_{BSet,1}$ is higher than the "optimum" set-filling-pressure $p_{BSet}$ that is shown in FIG. 4 as the dot and dash line. Since the set-filling-pressure $p_{BSet,1}$ of the first cycle is higher as the "optimum" set-filling-pressure $p_{BSet,opt}$ the set-filling-pressure $p_{BSet}$ is reduced by p since after having completed the first cycle the characteristic K is higher than zero.

Since also the set-filling-pressure $p_{BSet,2}$ of the second cycle is higher as the "optimum" set-filling-pressure $p_{BSet,opt}$ and therefore the characteristic K is higher than zero, the set-filling-pressure is reduced further, namely to $p_{BSet,3}$ that is now lower than the "optimum" set-filling-pressure $p_{BSet,opt}$. As a consequence of the set-filling-pressure $p_{BSet,3}$ that is now lower than the "optimum" set-filling-pressure $p_{BSet,opt}$, the corresponding characteristic K in this cycle has the value lower than or equal to zero, since as a result of the required additional filling of the clutch cylinder 4 the actual pressure in the pressure system 2 is lower than the set-abutting-pressure $p_{ASet}$. On the one hand, this means a change of sign for the characteristic K, resulting in that from this point on the increment p is reduced from cycle to cycle (in this case cut in half each time). On the other hand, the algebraic sign of the characteristic K is now minus so that now for the fourth cycle the set-filling-pressure $p_{BSet,4}$ in comparison to the set-filling-pressure $p_{BSet,3}$ of the third cycle is increased by the reduced increment p.

As shown in FIG. 4, the set-filling-pressure $p_{BSet,i}$ comes closer to the "optimum" set-filling-pressure $p_{BSet,opt}$, wherein an increment p is cut in half from cycle to cycle from the third cycle on. The process is terminated after the seventh cycle since now the increment p is lower than the threshold-neglect-pressure $p_{Neglect}$.

In the following, the reference signs are listed:
1 clutch
2 pressure system
3 clutch release spring
4 clutch cylinder
5 clutch piston
6 control valve
7 clutch lining
8 input side
9 clutch lining
10 output side
11 actual pressure too low
12 actual pressure too high
13 process
14 process
15 process
16 process
17 branching point
18 process
19 branching point
20 branching point
21 process
22 process
23 process

The invention claimed is:

1. Method for determining the filling pressure for a clutch that comprises clutch linings, a clutch release spring, and a hydraulic pressure system for closing the clutch against the force of the clutch release spring, wherein at an engagement point of the clutch, the clutch linings abut against each other and any further increase in pressure in the pressure system immediately creates the capacity of the clutch in transmitting a torque, said method comprising the following steps:
   A: subjecting the pressure system to a set-filling-pressure $p_{BSet}$;
   B: determining of an actual pressure $p_{Act}$ in the pressure system;
   C: terminating the subjection of the pressure system to the set-filling-pressure $p_{BSet}$ when the actual pressure $p_{Act}$ has reached at a time $t_1$ a threshold-turnoff-pressure $p_{Off}$;
   D: subjecting the pressure system to a set-abutting-pressure $p_{ASet}$ holding the engagement point of the clutch;
   E: determining a characteristic K indicating whether after the point in time $t_1$ between the points in time $t_3$ and $t_4$ the actual pressure $p_{Act}$ is above or below the set-abutting-pressure $p_{Aset}$;
   F: repeating the cycle with the steps A-E wherein the set-filling-pressure $p_{BSet}$ is changed at every repetition by an increment p until process terminating criterion is fulfilled; and
   G: storing of the set-filling-pressure $p_{BSet}$ of the last cycle.

2. The method according to claim 1, wherein the characteristic K is the integral of the difference between the actual pressure $p_{Act}$ and the set-abutting-pressure $p_{Aset}$ between the points in time $t_3$ and $t_4$ in accordance with the following equation:

$$K = \int_{t_3}^{t_4} (p_{Act} - p_{ASet}) \cdot dt.$$

3. The method according to claim 1, wherein the set-filling-pressure $p_{BSet}$ for the next cycle is increased by the increment p if the characteristic K is lower than zero.

4. The method according to claim 1, wherein the set-filling-pressure $p_{BSet}$ for the next cycle is reduced by the increment p if the characteristic K is higher than zero.

5. The method according to claim 1, wherein the increment p is reduced at least between 2 subsequent cycles.

6. The method according to claim 5, wherein the increment p is reduced when an algebraic sign of the characteristic K has changed between two cycles.

7. The method according to claim 1, wherein the termination criterion is fulfilled when the increment p reaches a value below a threshold-neglect-pressure $p_{Neglect}$.

8. The method according to claim 1, wherein termination criterion is fulfilled when the absolute value of the characteristic K is smaller than a threshold-neglect-characteristic $K_{Neglect}$.

9. The method according to claim 1, wherein the difference-pressure $p_{Diff}$ between the threshold-turnoff-pressure $p_{Off}$ and the set-filling-pressure $p_{BSet}$ is between 300 and 700 mbar.

10. The method according to claim 9, wherein difference-pressure $p_{Diff}$ is kept constant for an operating point of the clutch.

11. The method according to claim 9, wherein the difference-pressure $p_{Diff}$ depends on at least one of the rotational speed and temperature of a clutch and is determined from a characteristic diagram.

12. The method according to claim 1, wherein the starting value for the set-filling-pressure is about 400 to 1100 mbar above the set-abutting-pressure $p_{ASoll}$.

13. The method according to claim 1, wherein subjection of the pressure system with the set-filling-pressure $p_{BSet}$ starts from a pressure $p_0$ where the clutch is safely disengaged.

14. The method according to claim 1, wherein the time difference $t_{3,4}$ between the points in time $t_3$ and $t_4$ is about 30 ms.

15. The method according to claim 1, wherein the time difference $t_{1,3}$ between the points in time $t_1$ and $t_3$ is about 20 to 30 ms.

16. The method according to claim 1, wherein the pressure system comprises a control valve and a superseded pressure controller correcting an electric control current for the control valve.

17. The method according to claim 15, wherein when subjecting the pressure system with the set-filling-pressure $p_{BSet}$ the pressure controller is set to operate under a PD operating modus.

18. The method according to claim 16, wherein for 5-10 milliseconds after the point in time $t_1$ the superseded pressure controller is turned off and is turned on at a point in time $t_2$, wherein then preferably the superseded pressure controller is set to operate under a PID operating modus.

19. The method according to claim 17, wherein for a few 5-10 milliseconds after the point in time $t_1$ the superseded pressure controller is turned off and is turned on at a point in time $t_2$, wherein then preferably the superseded pressure controller is set to operate under a PID operating modus.

* * * * *

UNITED STATES PATENT AND TRADEMARK OFFICE
CERTIFICATE OF CORRECTION

PATENT NO. : 7,798,940 B2
APPLICATION NO. : 11/861269
DATED : September 21, 2010
INVENTOR(S) : Manfred Henning It is certified that error appears in the above-identified patent and that said Letters Patent is hereby corrected as shown below:

Column 5, Line 13:
Reads: a time to set the pressure is increased to a set-filling-pressure
Should read: a time $t_0$ the set pressure is increased to a set-filling-pressure Column 6, Line 42-43:
Reads: FIG. 4 shows the sequence if several set-filling-pressure-
   $sp_{BSet,1}$ of several sequential cycles. In the first cycle, the
Should read: FIG. 4 shows the sequence if several set-filling-pressures
   $p_{BSet,1}$ of several sequential cycles. In the first cycle, the Column 7, Line 56:
Reads: pressure $P_{Aset}$,
Should read: pressure $P_{Aset}$;

Column 8, Line 60:
Reads: The method according to claim 17, wherein for a few
Should read: The method according to claim 17, wherein for Signed and Sealed this Seventh Day of December, 2010

David J. Kappos
*Director of the United States Patent and Trademark Office*